April 22, 1941.   L. BESCHKINE   2,239,313
POSITIVELY AND PROGRESSIVELY ACTING SPEED VARYING DEVICE
Filed Aug. 29, 1939   10 Sheets-Sheet 1

April 22, 1941. L. BESCHKINE 2,239,313
POSITIVELY AND PROGRESSIVELY ACTING SPEED VARYING DEVICE
Filed Aug. 29, 1939 10 Sheets-Sheet 4

April 22, 1941. L. BESCHKINE 2,239,313
POSITIVELY AND PROGRESSIVELY ACTING SPEED VARYING DEVICE
Filed Aug. 29, 1939 10 Sheets-Sheet 6

April 22, 1941.  L. BESCHKINE  2,239,313
POSITIVELY AND PROGRESSIVELY ACTING SPEED VARYING DEVICE
Filed Aug. 29, 1939   10 Sheets-Sheet 8

Patented Apr. 22, 1941

2,239,313

UNITED STATES PATENT OFFICE 2,239,313

POSITIVELY AND PROGRESSIVELY ACTING SPEED VARYING DEVICE

Leon Beschkine, Paris, France

Application August 29, 1939, Serial No. 292,508
In France September 9, 1938

4 Claims. (Cl. 74—125.5)

The speed varying device which is the object of the invention is essentially characterized by the use of gears which have contours whereof the points are at variable distance from their respective axes of rotation, in order to enable respective speed ratios to be obtained and the variable speed ratios to be obtained and the shape of which has been so chosen as to provide the continuous intermeshing of said gears, by means of appropriate teeth; since the gears always remain in engagement, it is not necessary to provide "synchromesh" devices as in gearboxes provided with sliding gears.

Furthermore, the aforesaid gears, which are respectively fixed on the driving shaft or on the driven shaft, are successively secured to the shaft which carries them, either directly or through the intermediary of other appropriate gears, during equal intervals of time that are fractions of the duration of a complete revolution, by an appropriate clutch device, in such a manner as only to transmit the power one after the other along driving arcs which involve equal angles and the length or the shape of which is such that the ratio of the speeds does not substantially or strictly vary from one end to the other of said arcs, the gears not transmitting the power outside the aforesaid intervals of time.

When intermediate gears are used, the leading arcs are driving and driven gears, preferably spiral arcs defined by the constancy of the product of their vector radius by their polar angle, so that the ratio of the speeds between the driving gear and the driven gear is absolutely constant for a given value of the angle of relative displacement of said intermediate gears with respect to each other.

The setting of the various driving or driven gears is such that their successive securing to the driving shaft or to the driven shaft is always effected at instants at which the speeds are equal whatever be the speed of rotation, so as to prevent any shock on the teeth and any wear of the clutch devices used, at the instant when a gear becomes disengaged and the next one transmits the power.

The change of speed is obtained either by modifying the relative setting of a group of gears mounted on one of the driving or driven shafts relatively to another group of gears fixed on the same shaft and symmetrical with the first gears, or again by varying the relative displacement of intermediate gears with respect to each other, which gears are mounted on one or a plurality of intermediate shafts and are adapted to roll respectively on the driving gears and the driven gears fixed on the driving and driven shafts.

The variation of the aforesaid angles of displacement determines in fact the change of the driving arc of the driven or driving gears and consequently the progressive variation of the speed ratios, owing to the variable contour of the gears chosen.

When the driving arc of each gear involves an angle smaller than $$\frac{2\pi}{n}$$

$n$ being the number of pairs of driving and driven gears, it is necessary to fix on the driving or driven shafts suitably balanced flywheels in order to retain the constant mean value of the speed ratio in spite of the non-continuity of the engagements of each successive gear.

In order to obtain the reverse operation, the speed varying device which is the object of the invention is combined with an epicyclic gear or a differential of any type.

In order better to show the operation of the speed varying device which is the object of the invention, the preferred embodiments have been described and illustrated in the accompanying drawings.

Figure 1:
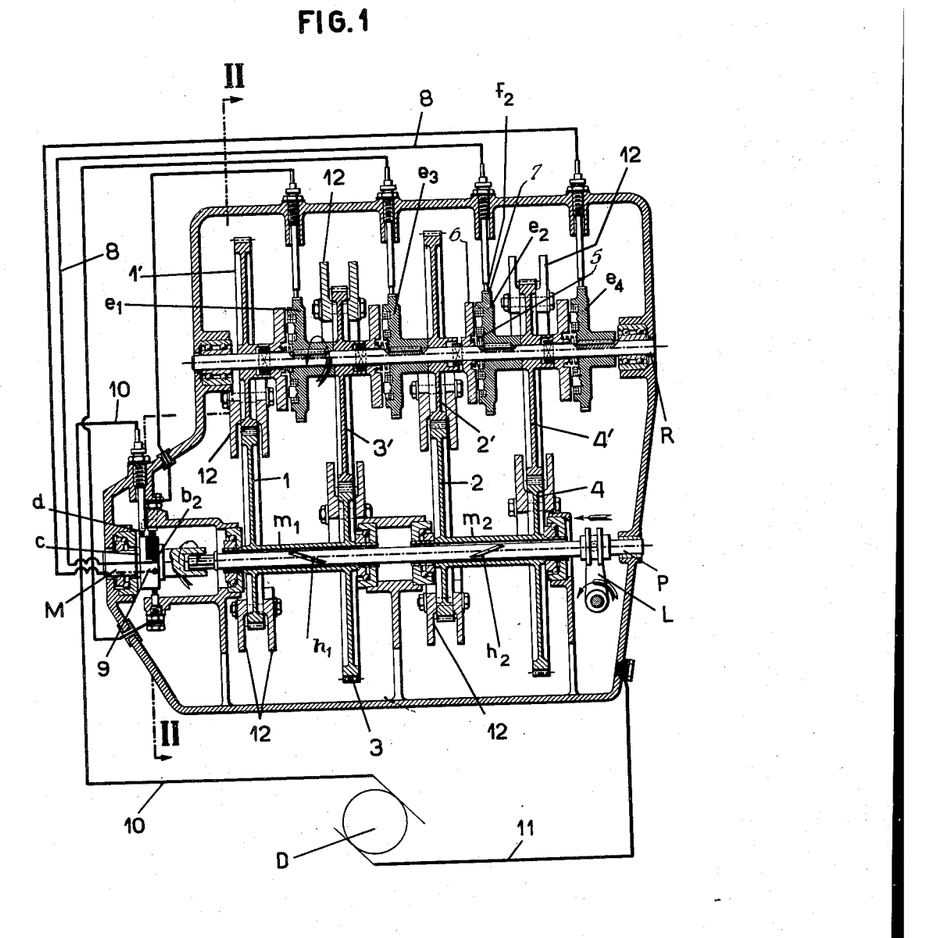
Fig. 1 is a diagrammatical longitudinal section of an embodiment of a change speed gear according to the invention.

In the embodiment shown in Fig. 1, the speed varying device which is the object of the invention essentially comprises driving gears 1, 2, 3 and 4 fixed through the intermediary of sleeves $m_1$ and $m_2$ on a gear shaft P arranged in the axis of the driving shaft M and secured to same by a sliding key. Said gears engage by means of preferably double-helical teeth with driven gears 1', 2', 3' and 4', the contours of which are respectively the rolling curves of each of the contours of the driving gears 1, 2, 3 and 4.

The driven gears are loose on the driven shaft R and are adapted to be secured successively to said shaft R by means of corresponding electromagnetic clutches $e_1$, $e_2$, $e_3$, $e_4$.

Figure 3:
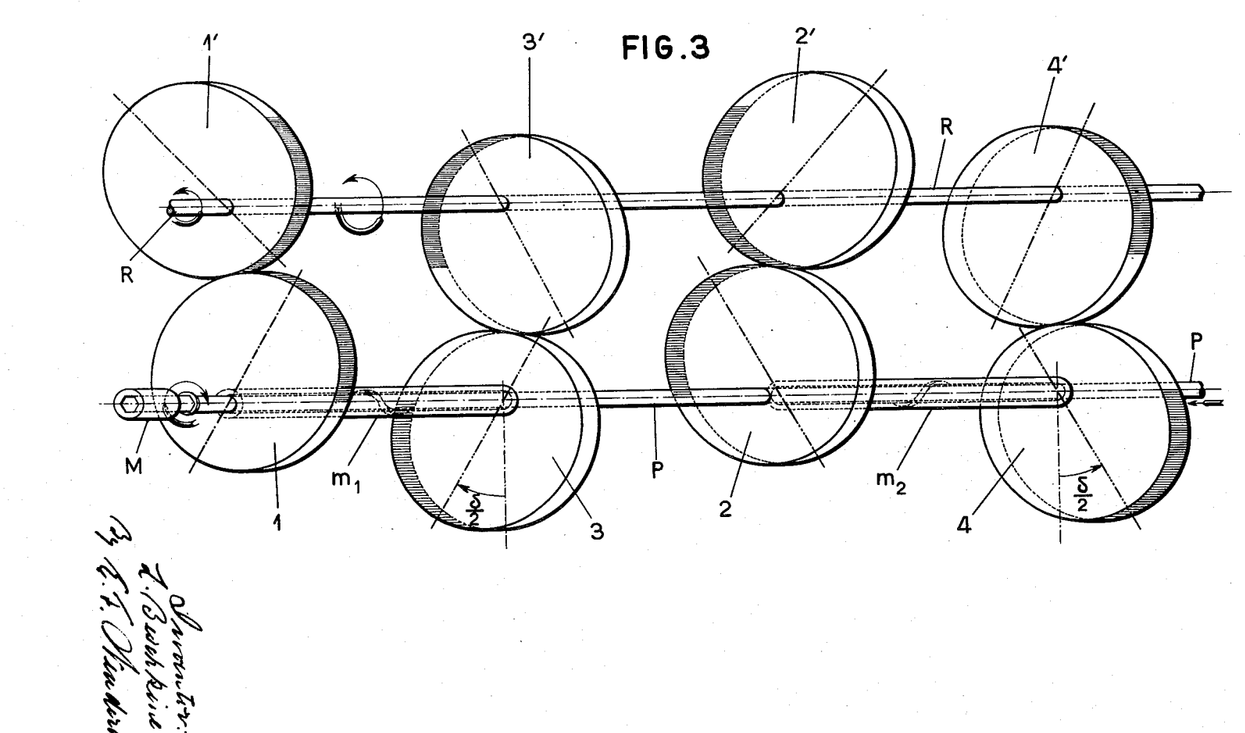
Fig. 3 is a diagrammatical isometric perspective view intended to show the method of setting the various gears and also their respective driving arcs.

In the embodiment described, the contours of the driving and driven gears are identical ellipses which rotate about one of their foci as shown more particularly in Fig. 3 in which the contours of the gears have been shown diagrammatically in isometric perspective with the teeth eliminated for the sake of clearness of the drawing.

The setting of the driving gears on the shaft P has been so chosen that the drive of the driven shaft R by the driven gears is successively obtained, during equal intervals of time and continuously, without any shock between the movable parts, the successive engagements of the driven gears with the driven shaft always being effected at instants when the angular speed of the driven shaft is the same for a given choice of the speed ratio.

For this purpose, the driving and driven gears have been distributed in two groups which are symmetrical with respect to each other: 1—1', 3—3' on the one hand, and 2—2', 4—4' on the other hand.

The operation of the speed varying device is in this case as follows: each driven gear, which always remains engaged with the driving gear that drives it, is secured to the shaft R solely during an interval of time which corresponds, in the embodiment described, to a quarter revolution of the driving shaft; outside this interval of time, the driving gear, which is loose on the shaft R, does not drive said shaft.

When a driven gear, for example the gear 1', is secured to the shaft R by the electromagnet $e_1$, the drive of said gear is effected along an arc which can be seen in Fig. 3 in which the useful driving area of the various gears and in particular that of the gears 1 and 1' has been shaded, the teeth being assumed to be removed.

The length of the driving arc has been so chosen that the ratio of the angular speeds of the driven and driving shafts does not vary much along said arc.

At the next quarter revolution the gear 1' is disengaged whereas the gear 2' belonging to the symmetrical group is secured to the shaft R by the clutch $e_2$. It is this particular position corresponding to the beginning of the engagement of the gear 2' that has been shown in Figs. 1 and 3. During this quarter revolution the gears 1', 3' and 4' are loose on the shaft R. This latter shaft is thus successively driven during the four quarters of a revolution by the gears 1', 2', 3' and 4' along driving arcs involving equal angles. The engagement of the various gears is effected in the suitable order by means of an electric control shown in Fig. 1.

In particular, the engagement of the gear 2' is effected by the electromagnet $e_2$ which, when energized, brings into the position of adherence, by compressing the spring 5, its armature 6 which is formed by a plate secured to the gear 2' by means of a polygonal coupling. The energizing circuit of the electromagnet $e_2$ is the following: electromagnet $e_2$, conducting ring 7, brush $f_2$, conductor 8, brush $b_2$ (shown in Fig. 2), conducting segment 9 of the commutator C, brush d, conductor 10, dynamo D, conductor 11 and return through the frame.

Figure 2:
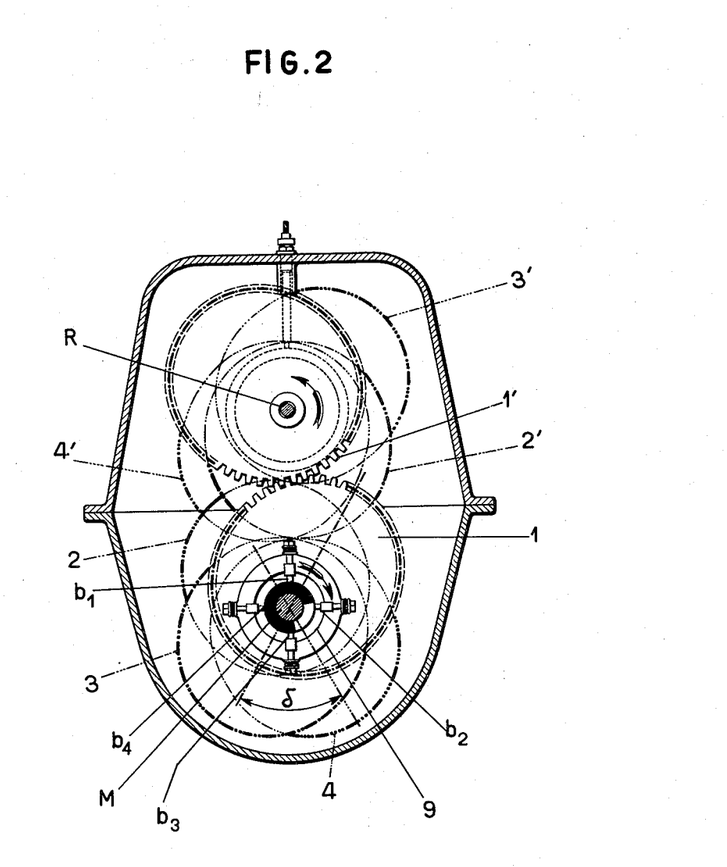
Fig. 2 is a section along II—II of Fig. 1.

As seen in Figs. 1 and 2, the order of sequence of the energizations of the electromagnets $e_1$, $e_2$, $e_3$, $e_4$ is controlled by the connection of said electromagnets to the brushes $b_1$, $b_2$, $b_3$, $b_4$ which are set at 90° and under which passes the segment 9 whereof the length is made equal to a quarter circumference.

It should be noted that the cores of the electromagnets which operate a large number of times per second are preferably made of laminated iron.

It should also be noted that the wear of the plates 6 is very small since when they come into contact with the electromagnets, the two movable parts rotate at the same speed.

The operation is very quick, since the air gap between the armature and the pole pieces is very reduced.

Finally, no shock can occur between the teeth of the gears at the instant when the gear 1' is disengaged and the gear 2' is engaged since, as can be more particularly seen in Fig. 3, the ratio between the vector radii at the points of tangency is the same for both pairs of gears 1—1', 2—2', thereby making the angular speed equal at this same instant.

In order to obtain the control of the speed varying device which is the object of the invention, the applicant changes the driving arc, thereby causing, owing to the variable contour of the gears, the change of the mean speed ratio taken along said arc.

The change of the driving arc is obtained for all the gears by varying the angle of displacement $\delta$ of the two symmetrical groups of driving or driven gears relatively to each other (see Fig. 2).

For this purpose, in the embodiment described, it is possible to effect, by means of a change speed lever L, the longitudinal movement of the gear shaft P. Said shaft P is provided with oppositely directed helical keys $h_1$ and $h_2$ which cooperate with helical grooves cut internally in the walls of the sleeves $m_1$ and $m_2$ to which the groups of gears 1—3 and 2—4 are respectively secured.

It will thus be understood that the movement of the shaft P in its bearings causes the groups of gears 1—3 and 2—4 to rotate in opposite directions and through an appropriate angle $$\frac{\delta}{2}$$

shown in Fig. 3, thereby producing the gradual change of the ratio of the speeds from a maximum value $k$ to a minimum value $$\frac{1}{k}$$

which values both correspond to positions of the driving arcs in which the middle of said arcs coincide with the tops of the ellipses forming the contour of the gears.

In order to prevent vibrations and deformations of the shafts, the gears have been suitably balanced by means of counterweights 12.

It would be possible to eliminate the groups of gears 3—3' and 4—4' by effecting the drive, during the two corresponding quarter revolutions, by means of flywheels respectively fixed on the driving and driven shafts.

In order to obtain reverse operation, the device shown in Fig. 1 may be combined with an appropriate epicyclic gear train.

In order to compensate for the periodical variation of speed of the driven shaft, which variation is due to the fact that the ratio of the speeds is not absolutely constant along a driving arc, the applicant has imagined a modification in which intermediate gears carried by an auxiliary shaft and respectively adapted to engage with the driving and driven gears, make absolutely constant, owing to the appropriate shape of their contour, the ratio between the angular speeds of the driving and driven gears on which they roll; the value of said ratio is moreover proportional to the angle between the settings of said intermediate gears.

The applicant has found that the contour of the driving and driven gears which fulfils the condition of making the speed ratio constant, must be formed by spiral arcs defined by the constancy of the product of their vector radius by their polar angle.

The contours of the intermediate gears are the rolling curves of the contours of the driving and driven gears.

Figure 4:
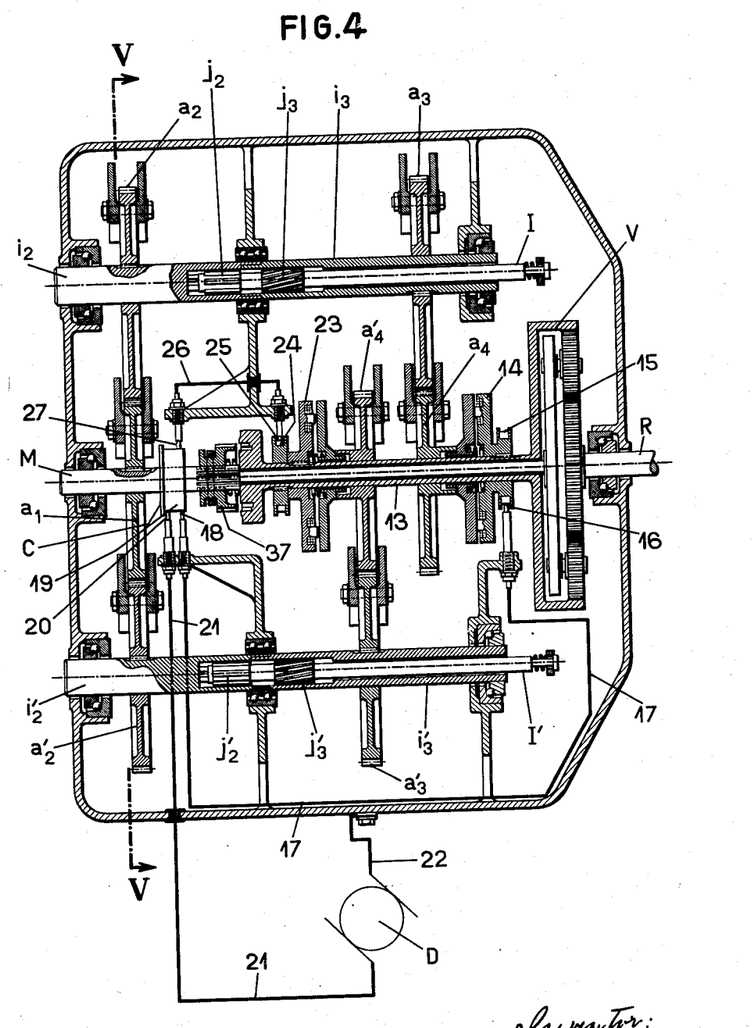
Fig. 4 is a longitudinal section of a modification of another embodiment according to the invention.
Figure 5:
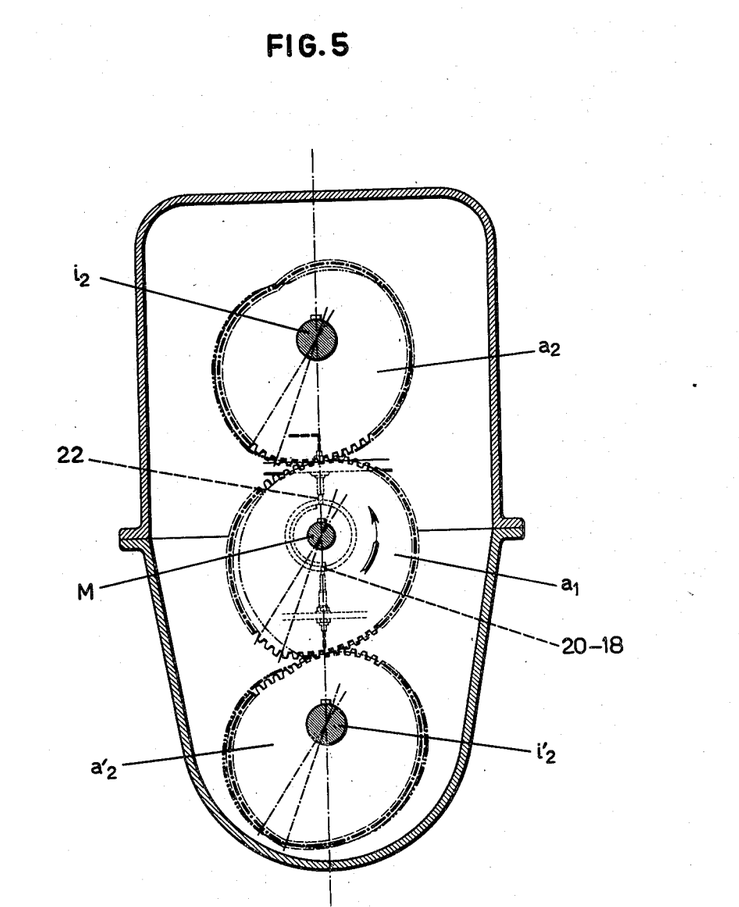
Fig. 5 is a section along V—V of Fig. 4.

If the leading arcs of the gears have necessarily to be spiral arcs, the same is not the case for the return arcs which may theoretically have any contour; however, in the embodiment described in Fig. 4, the return arcs and the leading arcs are formed by arcs of the same family of spirals in order to facilitate manufacture.

In the embodiment described in Fig. 4, there is only one driving gear $a_1$ keyed on the driving shaft M; this single gear respectively drives two driven gears $a_4$ and $a'_4$ on the one hand by means of intermediate gears $a_2$ and $a_3$ which are respectively secured, by means of sleeves $i_2$ and $i_3$, to an intermediate shaft I, and on the other hand by means of intermediate gears $a'_2$ and $a'_3$ which are secured by means of sleeves $i'_2$ and $i'_3$ to a second intermediate shaft I'.

Figures 7, 9:
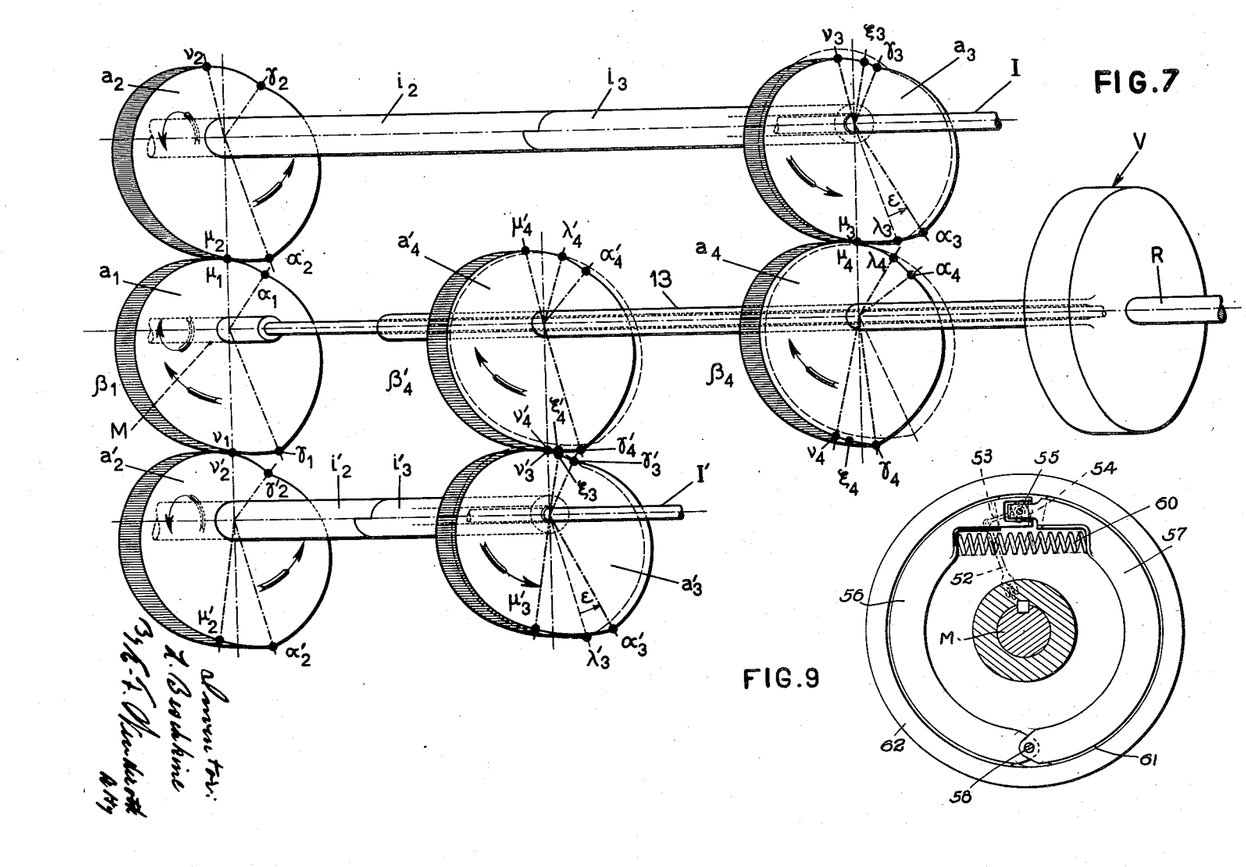
Fig. 7 is a diagrammatical isometric perspective view intended to show the respective setting of the various gears and their respective driving arcs.
Fig. 9 is a partial section along IX—IX of Fig. 8.

The useful driving areas of the gears have been shown shaded in the isometric perspective view in Fig. 7. In order to facilitate reading, the teeth have been removed.

In the embodiment described in Fig. 4, the gears $a_4$ and $a'_4$ slide with running friction on a hollow shaft 13 secured to the ring of the epicyclic gear train V co-operating with the speed varying device which is the object of the invention.

The contours of the gears $a_1$, $a_4$, $a'_4$ on the one hand, and $a_2$, $a_3$, $a'_3$ on the other hand are preferably identical and are so chosen that the gears can roll on each other and remain in constant engagement by means of their teeth. Furthermore, said contours have been so calculated that, along the same driving arc taken on the leading arcs $\alpha_4$, $\beta_4$, $\gamma_4$, $\alpha'_4$, $\beta'_4$, $\gamma'_4$ of the driven gears (see Fig. 7), the ratio between the angular velocities of the gear $a_1$ on the one hand and the driven gears $a_4$ or $a'_4$ on the other hand, is absolutely constant. It ensues that the successive securing of the driven gears $a_4$ and $a'_4$ to the sleeve 13, at each half-revolution of the driving shaft, causes the continuous drive of the driven shaft R through the intermediary of the epicyclic gear train V; there is no longer that periodical variation of speed that was obtained in the first embodiment described.

Fig. 7 shows the gears in a position in which the gear $a'_4$ has just completed its period of drive of the driving shaft whereas the gear $a_4$ has just been secured by its corresponding electromagnet 14 to the hollow shaft 13. The shaded surfaces show that to a driving arc $\nu_1$, $\mu_1$, taken on the gear $a_1$ and involving a semi-circumference, there correspond for an angle of set $\epsilon$ between the intermediate gears, a driving arc $\nu_4$, $\mu_4$, on the gear $a_4$ and a driving arc $\nu'_4$, $\mu'_4$ on the gear $a'_4$, which arcs involve angles which differ from a semi-circumference.

The energizing circuit of the electromagnet 14 is as follows: electromagnet 14, conducting ring 15 of the electromagnet, brush 16, conductor 17, brush 18, conducting segment 19 covering a semi-circumference of the commutator C, brush 20, conductor 21, dynamo D, conductor 22 and return through the frame.

The electromagnet 23 of the gear $a'_4$ is actuated in the same manner every half-revolution by its own energizing circuit: electromagnet 23, conducting ring 24, brush 25, conductor 26, brush 27, segment 19 of the commutator C, brush 20, conductor 21, dynamo D, conductor 22 and return through the frame.

Figure 6:
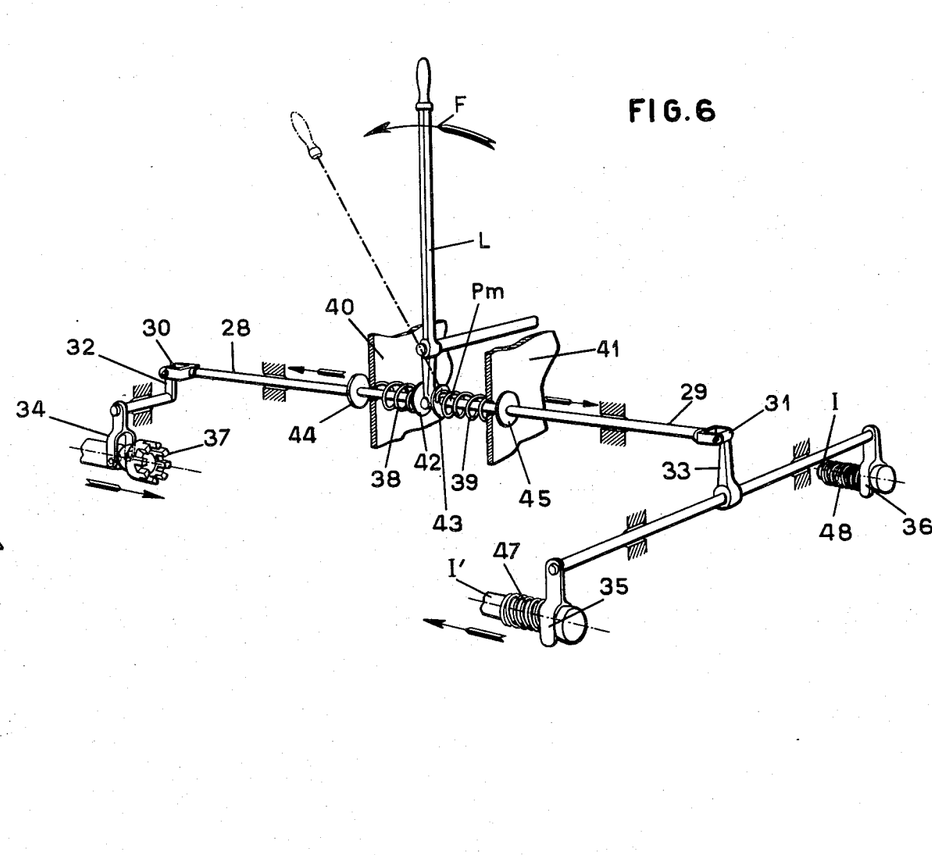
Fig. 6 is a diagrammatical perspective view intended to show the arrangement of the control of the change speed gear and of the direct drive of the embodiment of Fig. 4.

The control of the change speed gear is effected by means of a lever L which co-operates with an appropriate system of rods shown diagrammatically and in perspective in Fig. 6.

Said system of rods comprises two elements 28 and 29 which are pivoted at 30 and 31 to connecting rods 32 and 33 which respectively cause to pivot about their axes on the one hand a stirrup 34 controlling a toothed clutch 37 and on the other hand two stirrups 35 and 36 respectively controlling the longitudinal movement of the shafts I' and I in their sleeves $i'_2$—$i'_3$ and $i_2$—$i_3$.

The shafts I and I' are provided with straight splines $j_2$—$j'_2$ and with helical splines $j_3$—$j'_3$. Said splines are adapted to engage with corresponding grooves cut in the walls of the sleeves $i_2$—$i_3$ and $i'_2$—$i'_3$. Consequently the longitudinal movement of the shafts I and I' causes the gears $a_3$ and $a'_3$ to rotate relatively to each other, in the same direction and through the same angle $\epsilon$, relatively to the gears $a_2$ and $a'_2$ respectively.

When the lever L is rotated in the direction of the arrow F from the position shown in full lines in Fig. 6 and corresponding to the position (in dotted lines in Fig. 7) of the driven gears $a_3$ $a_4$ and $a'_3$ $a'_4$ by the continuous variation of the angle $\epsilon$ from zero, the variation of the driving arc of the gear $a_4$ is produced and consequently the likewise continuous variation from the value 1 of the ratio between the speeds of the driving shaft M and the hollow shaft 13 owing to the change of position of the driving arc of each driven gear $a_4$, $a'_4$ on its leading arc $\alpha_4$ $\beta_4$ $\gamma_4$, $\alpha'_4$ $\beta'_4$ $\gamma'_4$.

During this operation, the shaft R changes from the maximum speed equal to the speed of the shaft M to zero speed at the neutral point $P_m$, then to increasing speeds in the opposite direction by the action of the epicyclic gear train V.

By moving the lever L in the opposite direction to the arrow F, direct drive is obtained by securing, by means of the toothed clutch 37, the hollow shaft 13 which is integral with the ring gear of the epicyclic gear train V to the shaft M, which is itself secured to the planet gear support of the differential.

As seen in Fig. 6, appropriate springs 38 and 39, which bear, on the one hand on shoulders 40 and 41 of the frame, and on the other hand on plates 42 and 43 fixed to the ends of the rods 28 and 29, respectively effect the return to the direct drive position of the clutch 37 on the one hand and of the shafts I and I' on the other hand.

Auxiliary plates 44 and 45, secured to the rods 28 and 29, limit this return movement.

The purpose of such an arrangement is on the one hand to disengage the clutch 37 when the lever L is rotated in the direction of the arrow F, that is to say when it is desired to vary the speed progressively in one direction or in the other, and on the other hand to maintain the ratio between the speed equal to 1 when the lever L is moved in the opposite direction to the arrow F, that is to say when it is desired to change to direct drive.

The applicant has also provided, in the embodiment more particularly shown in Figs. 4 and 6, a resilient drive for the shafts I and I' by means of Belleville washers 46 and 47 so as to enable the splines of the shafts I and I' to engage with the sleeves secured to the intermediate gears, solely during the interval of time when said gears are loose on the hollow shaft 13.

By the action of the lever L, the shafts I and I' can in fact only displace the gears $a_3$ and $a'_3$ successively through the angle $\epsilon$, since at each half revolution only one driven gear rotates freely on the shaft 13.

Figure 8:
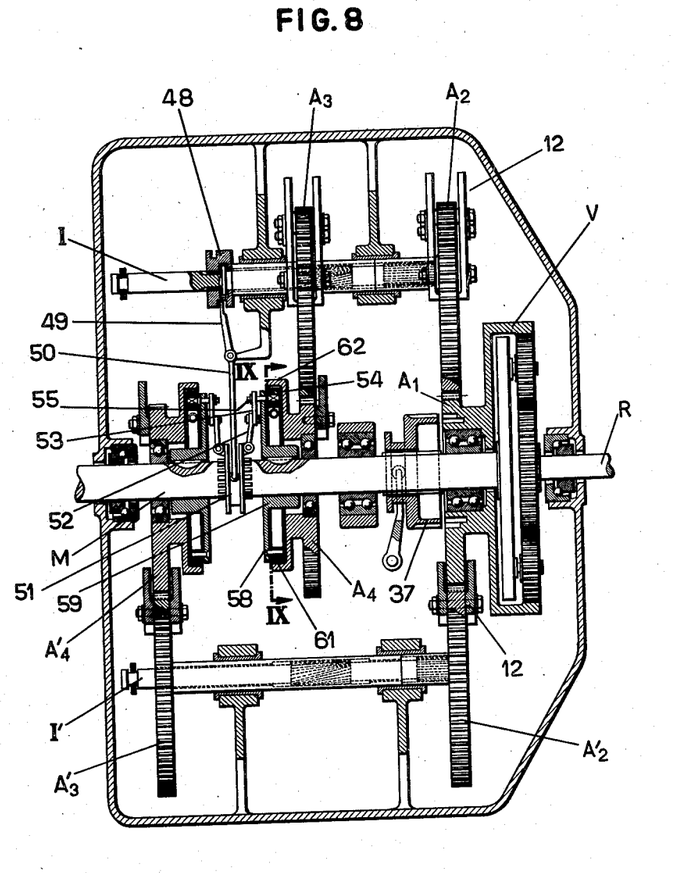
Fig. 8 is a view of a modification in which the clutch devices are purely mechanical and of the jaw type.

Fig. 8 shows a modification of the embodiment illustrated in Figs. 4, 5, 6 and 7.

In this modification, the single driven gear $A_1$ is secured to the crown wheel of the epicyclic gear train V. On said gear roll intermediate gears $A_2$ and $A'_2$ respectively connected, by means of corresponding intermediate shafts I and I', to intermediate gears $A_3$ and $A'_3$ which roll on the driving gears $A_4$ and $A'_4$.

The driving gears $A_4$ and $A'_4$ are secured to the driving shaft every half revolution by a clutch which may be electromagnetic, as in the previously described embodiments or purely mechanical as shown in Figs. 9 and 9.

Such a mechanical clutch could also be applied to the aforesaid speed varying devices.

Said clutch is essentially characterized by jaws which are provided with brake linings and the moving apart of which is effected by means of an appropriate spring and causes the driving shaft to be secured to the corresponding driven gear.

In particular, if reference is had to Figs. 8 and 9 and if the clutch device for the gear $A_4$ is examined, it will be seen that said clutch is actuated by a grooved sleeve 48 which is secured to the shaft I by a sliding key. The rotation of 48 about its axis imparts, through the intermediary of connecting rods 49 and 50, a reciprocating movement to a grooved sleeve 51 which slides on splines of the driving shaft M.

The movement of the sleeve 51 causes, through the intermediary of the arm 52 and of the connecting rod 53, the gear 54 to rotate alternately in one direction and in the other about its shaft 55, causing the jaws 56 and 57 which pivot about the shaft 58 to move successively towards each other and apart; the shafts 55 and 58 are secured to a plate 59 which is keyed on the driving shaft.

Fig. 9 shows the gear 54 at the instant when it compresses the spring 60 and moves the jaws 56 and 57 towards each other. The spring 60, by causing the jaws 56 and 57 to move apart, causes the plate 59 and consequently the driving shaft M to be secured to the driven gear $A_4$ by means of the brake lining 61 which makes the jaws adhere to a cylindrical female boss 62 provided on the lateral face of the gear $A_4$.

The arrangement of the device is such that the period of rocking of the gear 54 about its axis corresponds to an opening of the jaws for each half revolution of the gear $A_1$.

Figure 10:
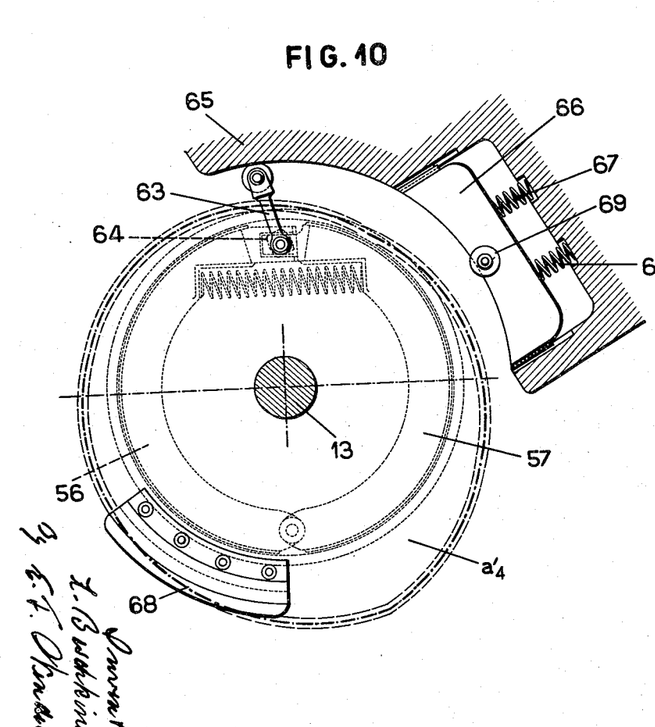
Figs. 10 and 11 are transverse and longitudinal diagrammatical sections of a mechanical clutch device controlled by the gears themselves.

In another modification, the securing of the driven gears to the driven shaft can be effected by the gears themselves without making use of the movements of the shaft carrying the driving gears. It will in fact be realized (see Fig. 7) that if the angle of setting $\epsilon$ is always in the same direction, the gear $a_4$ must be secured to the shaft 13 in an interval inside the driving arc $\lambda_4$ $\beta_4$ $\gamma_4$, the point $\lambda_4$ and its homologous point $\lambda_3$ being defined by the fact that they come into register at the instant when the points $a_1$ and $a_2$ coincide. Similarly $a'_4$ must be secured to the shaft 13 in an interval inside the driving arc. $\lambda'_4$ $\beta'_4$ $\gamma'_4$, $\lambda'_4$ being defined like $\lambda_4$. The above conditions can be fulfilled in the following manner:

The gear $a_4$ is released from the shaft 13 at the instant when a point $\xi_4$, which is chosen inside the leading arc $a_4$ $\beta_4$ $\gamma_4$ and preferably adjacent $\gamma_4$, comes into register with its homologous point $\xi_3$ of the gear $a_3$ by means of a lever 63 which is secured to a tumbler 64 (see Fig 10) which controls the distance between the jaws 56 and 57 as in the embodiment of Fig. 9 and which is adapted to abut against a fixed boss 65 provided with an element 66 adapted to be retracted inwardly and to compress resilient members 67 by the action of a boss 68, provided on the gear $a'_4$, through the intermediary of a roller 69 secured to said element 66.

Figure 11:
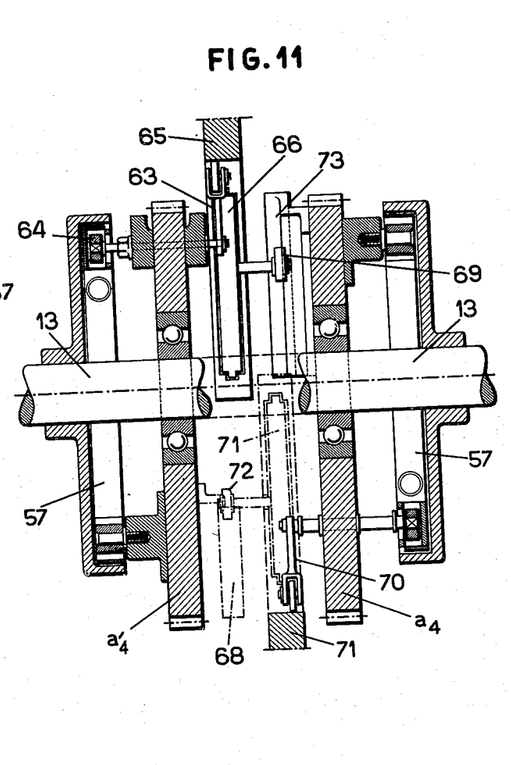

The boss 68 is arranged on the gear $a'_4$ at such a spot that the retraction of the element 66 preferably occurs at the instant when the point $\xi'_4$, which corresponds on the gear $a'_4$ to the point $\xi_4$ of the gear $a_4$, comes into register with its homologous point $\xi'_3$ of the gear $a'_3$. At this instant, the gear $a_4$ is secured to the shaft 13 whereas the gear $a'_4$ is liberated from the shaft 13 by means of members which are similar to the previous ones (visible in Fig. 11) and comprise: a lever 70 secured to a tumbler fixed to the gear $a'_4$; a fixed boss 71 having a movable element provided with a roller 72 similar to the roller 69; a boss 73 carried by the gear $a_4$.

By means of such an arrangement the applicant obtains the successive drive of the driven shaft by each of the driven gears by directly or indirectly effecting the locking of one of them to the driven shaft by moving the other gear to a position which is fixed relatively to the plane of the shafts and which is suitably chosen beforehand, said position being also that in which this latter gear becomes free on the shaft that carries it.

It would also be possible to provide for the release of one gear by the locking of the other.

Figure 12:
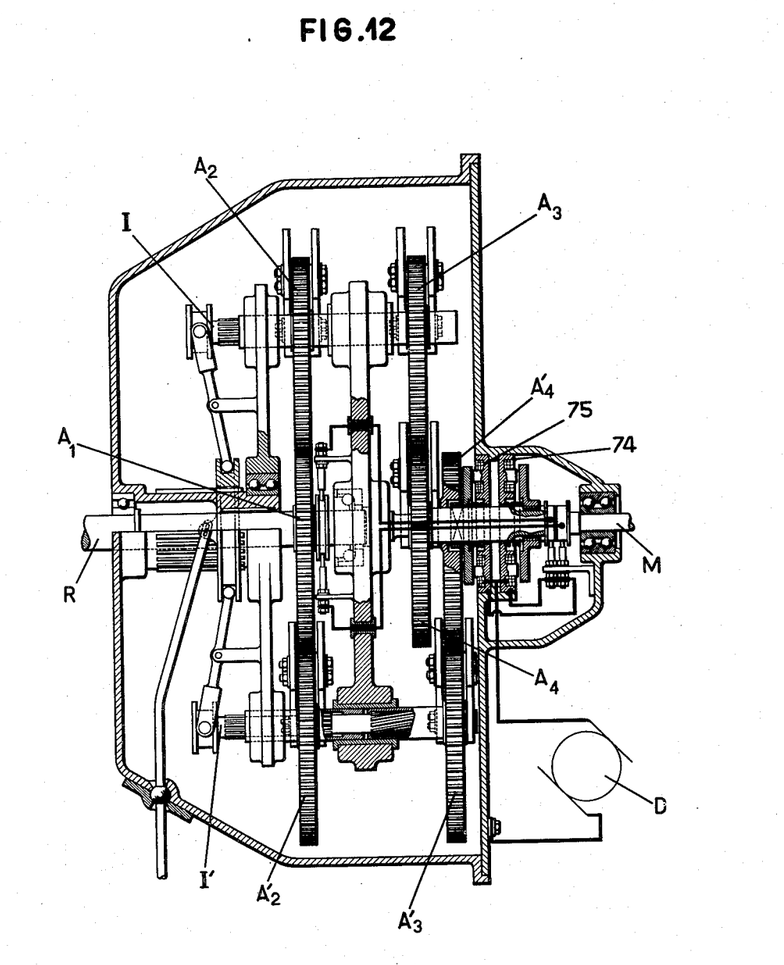
Fig. 12 is a longitudinal diagrammatical section of a modification of the speed varying device which is the object of the invention in which the differential is formed by means of the gears of the speed varying device.

In Fig. 12 a diagrammatical view has been shown of a further modification in which the epicyclic gear train is obtained with the intermediate gears which act as planet gears respectively rolling on the driving and driven gears.

The intermediate shafts I—I' are driven by the shaft M secured to the planet wheel carrier.

The driving gears $A_4$ and $A'_4$ are secured to hollow shafts which can be locked every half revolution by means of corresponding fixed electromagnets 74 and 75. The single driven gear $A_1$ is directly keyed on the driven shaft R.

It is of course understood that the embodiments described are only given by way of examples, it being possible to make various modifications, changes and additions therein without thereby altering the general system of the invention.

Thus in particular the gears used may have very varied variable contours optionally of unequal length: it suffices for the contours of the driven gears to be rolling curves of the driving gears.

It would be possible, for example, to use articulated devices such as a hinged quadrilateral whereof one of the sides is fixed and acts as a frame.

In order to palliate the slight periodical variation of speed of the driven shaft along a driving arc, flexible joints of a known type may be used.

The fixing of suitably balanced and arranged flywheels on the driving and driven shafts contributes to increase the smoothness of operation. This smoothness may be further increased by setting the gears in such a manner that periods of transmission of power coincide with the periods during which the driving torque is at a maximum.

When it is desired to have an absolutely constant speed ratio along a driving arc, it is necessary to provide the driving and driven gears with contours whereof the useful arcs are formed by arcs of a curve of which the reciprocal of the vector radius is a linear function of the polar angle.

The return arcs may be of arbitrary shape.

The contours of the intermediate gears are in this case rolling curves of the contours of the driven and driving gears.

It is also possible to provide a plurality of leading arcs on the same gear so as to decrease the number of gears. It is advantageous to use only one or two pairs of gears when the speed varying device which is the object of the invention is mounted on a bicycle or a motorcycle.

The clutch devices for the driven or driving gears may be of very varied types and for example of the electromagnetic, hydraulic or mechanical type.

In particular, they may be formed by free wheels, but in this case it is often necessary to increase the speed of rotation of the driving gears, owing to the fact that the free wheels only lock on condition that their outer cage is driven faster than their inner hub which is keyed on the shaft to be driven.

It would also be possible to use cone or disc clutch devices of a usual type.

Since the various embodiments of the change speed gear which is the object of the invention provide in general a speed ratio which varies between fairly narrow limits, the applicant has preferably combined epicyclic gear trains with the various embodiments, thereby enabling the flexibility of the speed varying device to be increased and extended up to the change of direction of this speed. Said epicyclic gear trains may be composed of a variable number of wheels. It is also possible to form the epicyclic gear trains by means of the gears themselves.

The speed varying device which is the object of the invention may again co-operate, by means of appropriate driving devices, with a governor which is controlled either by the speed of the engine of the vehicle on which the speed varying device is mounted, or by the suction of the carburettor of the engine of said vehicle. It is thus possible to obtain a progressive and automatic change speed gear whereof the control is effected at every instant proportionally to the speed of the vehicle on which it is mounted.

It is possible in this case to eliminate completely the change speed lever and the clutch release device.

Finally, it is possible to give the setting of the various gears appropriate angles of advance or retardation for taking into account the inertia of the various mechanical parts and also of the electromagnetic clutch devices which may optionally be used.

What I claim is:

1. In a variable speed device with progressive action at least one driving non-circular gear secured to a driving shaft, a driven shaft in alignment with said driving shaft, non-circular driven gears mounted upon said driven shaft and entrained by said driving gear, auxiliary shafts located in planes parallel to said driving shaft, an intermediate non-circular gear mounted upon one of said auxiliary shafts and constantly in mesh with said driving gear, an intermediate non-circular gear mounted upon one of said auxiliary shafts and constantly in mesh with said driven gear, the intermediate gears mounted upon an auxiliary shaft forming between them an angle whose variation secures a change of speed of the driven shaft, means controlling the variation of said angle, means for clutching the driven gears successively with the shaft carrying them in such manner as to permit them to enter into action successively at predetermined intervals, the conducting arcs of said driving and driven gears being formed by spiral arcs defined by an invariable product of their vector radius by their polar angle whereby there is obtained along the entire arc of engagement of a predetermined length an absolutely constant relationship between the angular speeds of the driving and driven gears for any angle between the intermediate gears, the said relationship varying with variations of said angle.

2. In a variable speed device as set forth in claim 1 an elastic control for changing the speed designed to control the unclutching of said intermediate gears during any portion of a revolution.

3. In a variable speed device as set forth in claim 1, a plurality of driving gears which are divided into two symmetrical groups.

4. In a variable speed device as set forth in claim 1, means for unmeshing certain pairs of gears and setting the remaining gears in such manner that said gears transmit the power during the periods of time in which the mean value of the driving torque is a maximum.

LEON BESCHKINE.